UNITED STATES PATENT OFFICE.

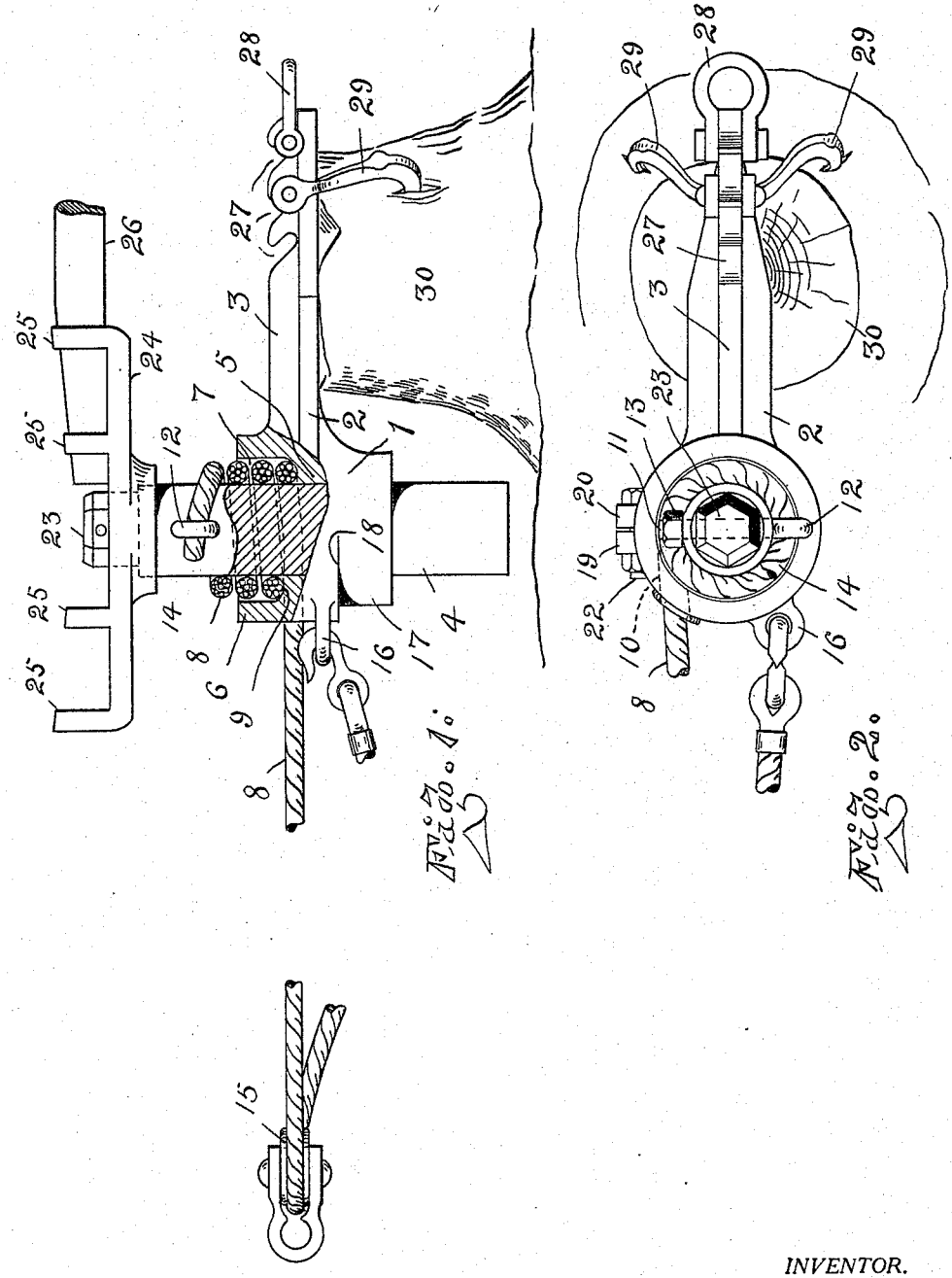

BENJAMIN E. SHINOE, OF DULUTH, MINNESOTA, ASSIGNOR OF ONE-HALF TO FRANK A. BOOREN, OF DULUTH, MINNESOTA.

CENTER-DRAFT FAIR-LEAD.

1,175,384.         Specification of Letters Patent.      Patented Mar. 14, 1916.

Application filed June 17, 1915. Serial No. 34,753.

*To all whom it may concern:*

Be it known that I, BENJAMIN E. SHINOE, a citizen of the United States, residing at Duluth, in the county of St. Louis and State of Minnesota, have invented certain new and useful Improvements in Center-Draft Fair-Leads, of which the following is a specification, reference being had therein to the accompanying drawing.

This invention relates to line controlling devices and especially to a center-draft fair-lead for draft lines.

In this application, the invention is illustrated as applied to a stump puller, though it is evident the same may be applied to draft lines in many other forms than stump pullers.

The object is to produce a device of this character wherein the line, being wound up, will impart as nearly as possible a center draft upon the mechanism in which it is being wound and thus reduce to a minimum any abnormal friction or draft thereupon.

Other objects and advantages will appear in the further description of the device.

In the accompanying drawings, in which like reference numerals indicate like parts: Figure 1 is a side elevation of my improved device partly in section, and: Fig. 2 is a top plan view with the sweep attachment removed.

1 represents a journal bearing or housing designed to be suspended within a line of draft intermediate two predetermined points, such as two stumps or the like. For the purpose of holding the journal bearing in a fixed position, a laterally extending inverted T-shaped supporting member 2 is formed integral with one side of the journal bearing 1, and is provided with an upwardly extending rib 3, the office of which will be described later. A shaft or spindle 4 of any desired or convenient length is mounted within the bearing 1, and in the centermost bore 5 of the bearing is designed to be an easy running fit. The uppermost portion of the bearing 1 is formed into an annular rim 6 having sufficiently large bore 7 to freely encircle the cable 8 when wound around the spindle 4 therein.

The bottom wall 9 of the bore 7 is of a concave spiral form in which the cable 8 snugly rests when being wound around the spindle 4 as it enters the hole 10 and which latter is formed at a tangent to the bore of the bearing. The pitch of the spiral thus formed in the base of the bore 7 is preferably slightly greater than that of the natural pitch assumed by the line 8 as it winds about the spindle 4, this increase of pitch being for the purpose of keeping the turns of the cable somewhat slightly apart for best results as they are wound about the spindle.

An eye-bolt 11, having an eye 12 at one end and a suitable nut 13 at the opposite end is passed through a suitable hole in the spindle 4, and provides means for fastening the end 14 of the cable 8 to the spindle. The cable 8 extends, preferably, from the hole 10 in the bearing through the snatch-block 15 to which the load to be drawn is attached in any convenient manner, and thence back to an eye 16 formed integral with the front face wall of the bearing and into which it may be hooked or fastened as desired. The eye 16 is positioned equidistant from the center line of draft of the device, to that of the hole 10, so that the center of the bite of the cable 8 will normally assume a direct line with the supporting member 2.

The lower extremity 17 of the bearing 1 is reduced somewhat in outward diameter to that of the upper portion and, for half of the circumference thereof, is separated from the upper portion as at 18 and thus made adjustable, and upon one side of the bearing, the two halves are separated and formed into laterally projecting lugs 19 and 20, the lug 20 being integral with the fixed half, and the lug 19 integral with the free end of the separated half. A bolt 21 passes through the lugs 19 and 20 and having a suitable threaded nut 22 thereupon, the free half carrying the lug 19 may be adjusted either toward or from the opposite half by tightening or loosening the nut. This adjustment is provided for a slight pinching of the spindle when in operation, to overcome too free action of same, as for instance, when slacking off the strain upon the cable and thus preventing the turns of the cable upon the spindle becoming unduly displaced by the resiliency thereof.

The upper end 23 of the spindle 4 is somewhat reduced in size and formed, preferably, into a hexagonal shank upon which the sweep head 24 is designed to removably fit. Upright bands 25 of any desired shape or size are formed integral with the oppositely disposed arms of the head 24 and into which, handspikes or sweeps 26 of any desired form may be readily engaged for turning the spindle 4, either by hand or horse power.

The rib 3 of the supporting member 2 has formed within it a plurality of inclined notches 27 and in which any form of holdfast means may be made to engage, such as the clevis 28 or a pair of pivotally connected dogs 29 which may be forced into the stump 30, and the latter alone or in conjunction with a suitable rope or cable in the clevis 28 answer to hold the device in position and against the draft applied to the line 8.

Having thus described my invention, what I claim as new and desire to secure by Letters Patent is:—

1. A device of the character described, comprising a journal bearing, having a hole of different diametrical dimensions, the base of the hole at one end of the bearing formed in a spiral and terminating in a hole through the side of the bearing for the reception of a cable, the base of the opposite end of the bearing being adjustable diametrically, and a spindle journaled within the bearing whereby the cable may be wound around the spindle and the latter held against free revolution by the adjustable end of the bearing.

2. A device of the character described, comprising a single hub like bearing having a hole therethrough of different diametrical dimensions, the wall intermediate the larger portion of the hole and the smaller portion thereof, formed in a spiral and terminating at one end in a hole through the side of the bearing, for the reception of a cable and supporting means formed integral with the bearing upon the same plane as the external entrance of the cable receiving hole, as and for the purpose described.

In testimony whereof I hereunto affix my signature in the presence of two witnesses.

BENJAMIN E. SHINOE.

Witnesses:
W. H. DENHAM,
S. GEO. STEVENS.

Copies of this patent may be obtained for five cents each, by addressing the "Commissioner of Patents, Washington, D. C."